(12) United States Patent
Qian et al.

(10) Patent No.: US 7,898,971 B2
(45) Date of Patent: Mar. 1, 2011

(54) METHOD AND APPARATUS FOR AUTOMATING HUB AND SPOKE INTERNET PROTOCOL VIRTUAL PRIVATE NETWORK TROUBLE DIAGNOSTICS

(75) Inventors: Zhiqiang Qian, Holmdel, NJ (US); Thomas Anderson, Imperial, MO (US); Paritosh Bajpay, Edison, NJ (US); Jackson Liu, Middletown, NJ (US); Sanjeeta Mohapatra, Marlboro, NJ (US); John Rowan, Bensalem, PA (US); Michael Zinnikas, North Brunswick, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 191 days.

(21) Appl. No.: 12/039,201

(22) Filed: Feb. 28, 2008

(65) Prior Publication Data

US 2009/0219823 A1    Sep. 3, 2009

(51) Int. Cl.
*G01R 31/08* (2006.01)
(52) U.S. Cl. .................... 370/250; 370/242; 370/245
(58) Field of Classification Search .............. None
See application file for complete search history.

(56) References Cited

U.S. PATENT DOCUMENTS

| | | | |
|---|---|---|---|
| 6,952,729 B2* | 10/2005 | Bialk et al. | 709/224 |
| 7,257,744 B2* | 8/2007 | Sabet et al. | 714/56 |
| 2004/0172466 A1* | 9/2004 | Douglas et al. | 709/224 |
| 2006/0002408 A1* | 1/2006 | Ould-Brahim | 370/406 |
| 2007/0115860 A1* | 5/2007 | Samele et al. | 370/259 |
| 2007/0226630 A1* | 9/2007 | Farid et al. | 715/734 |
| 2009/0161551 A1* | 6/2009 | Danner | 370/241 |

FOREIGN PATENT DOCUMENTS

WO    WO 2004004217 A1 *    1/2004

* cited by examiner

*Primary Examiner*—Chi H Pham
*Assistant Examiner*—Kouroush Mohebbi

(57) ABSTRACT

A method and apparatus for automating hub and spoke network trouble diagnostics in a communication network are disclosed. For example, the method retrieves provisioning and configuration data, access interface alarm information, and network facility status data related to the communication network by a diagnostic system, and identifies at least one of: a network configuration error, an access interface error, or a configuration error associated with at least one hub router or at least one spoke router, as the root cause of the problem of the communication network.

20 Claims, 4 Drawing Sheets

METHOD AND APPARATUS FOR AUTOMATING HUB AND SPOKE INTERNET PROTOCOL VIRTUAL PRIVATE NETWORK TROUBLE DIAGNOSTICS

The present invention relates generally to communication networks and, more particularly, to a method and apparatus for automating hub and spoke network trouble diagnostics in communication networks, e.g., packet networks such as Internet Protocol (IP) Virtual Private Network (VPN) networks.

BACKGROUND OF THE INVENTION

Network service providers are providing hub and spoke topology as new IPVPN service offering to customers who want better network control and more secured communications. Hub and spoke IP VPN topology prevents the VPN customers from communicating directly with each other and ensures that all traffic between customer endpoints to go through designated hubs. In a hub and spoke VPN, a VPN hub site interconnects with a plurality of VPN spokes to which customers endpoints are connected. Communications between customer endpoints connected via VPN spokes must go through the VPN hub. Direct communications between customer endpoints without going through the VPN hub is not allowed.

When hub and spoke network configuration problem occurs, the communications between hub sites and spoke network sites are lost or misrouted. Therefore, customers will experience service interruption or outage. When this occurs, service providers must determine the root cause and resolve the problem in a timely fashion to minimize the impact of customer's service.

SUMMARY OF THE INVENTION

In one embodiment, the present invention provides a method and apparatus for automating hub and spoke network trouble diagnostics in a communication network. For example, the method retrieves provisioning and configuration data, access interface alarm information, and network facility status data related to the communication network by a diagnostic system, and identifies at least one of: a network configuration error, an access interface error, or a configuration error associated with at least one hub router or at least one spoke router, as the root cause of the problem of the communication network.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Network service providers are providing hub and spoke topology as new IPVPN service offering to customers who want better network control and more secured communications. Hub and spoke IP VPN topology prevents the VPN customers from communicating directly with each other and ensures that all traffic between customer endpoints to go through designated hubs. In a hub and spoke VPN, a VPN hub site interconnects with a plurality of VPN spokes to which customers endpoints are connected. Communications between customer endpoints connected via VPN spokes must go through the VPN hub. Direct communications between customer endpoints without going through the VPN hub is not allowed.

When hub and spoke network configuration problem occurs, the communications between hub sites and spoke network sites are lost or misrouted. Therefore, customers will experience service interruption or outage. When this happens, service providers must find out the root cause and resolve the problem in a timely fashion to minimize the impact of customer's service. However, troubleshooting hub and spoke VPN problems are manually intensive and time consuming by manually retrieving hub and spoke VPN related information from routers using command line interface (CLI) commands and from network inventory database systems.

To address this criticality, the present invention enables automated hub and spoke IP VPN trouble diagnostics by pinpointing the root cause. For example, the present invention automatically retrieves hub and spoke IP VPN related information from IP VPN network equipment, compares retrieved information with inventory database data, checks the underlying network status, generates trouble diagnostic reports, and sends these reports to the appropriate work centers so that a speedy service recovery is ensured. Thus, the present invention provides tremendous efficiency over diagnostic methods that rely on manual processes to troubleshoot the hub and spoke IP VPN network problem.

Figure 1:
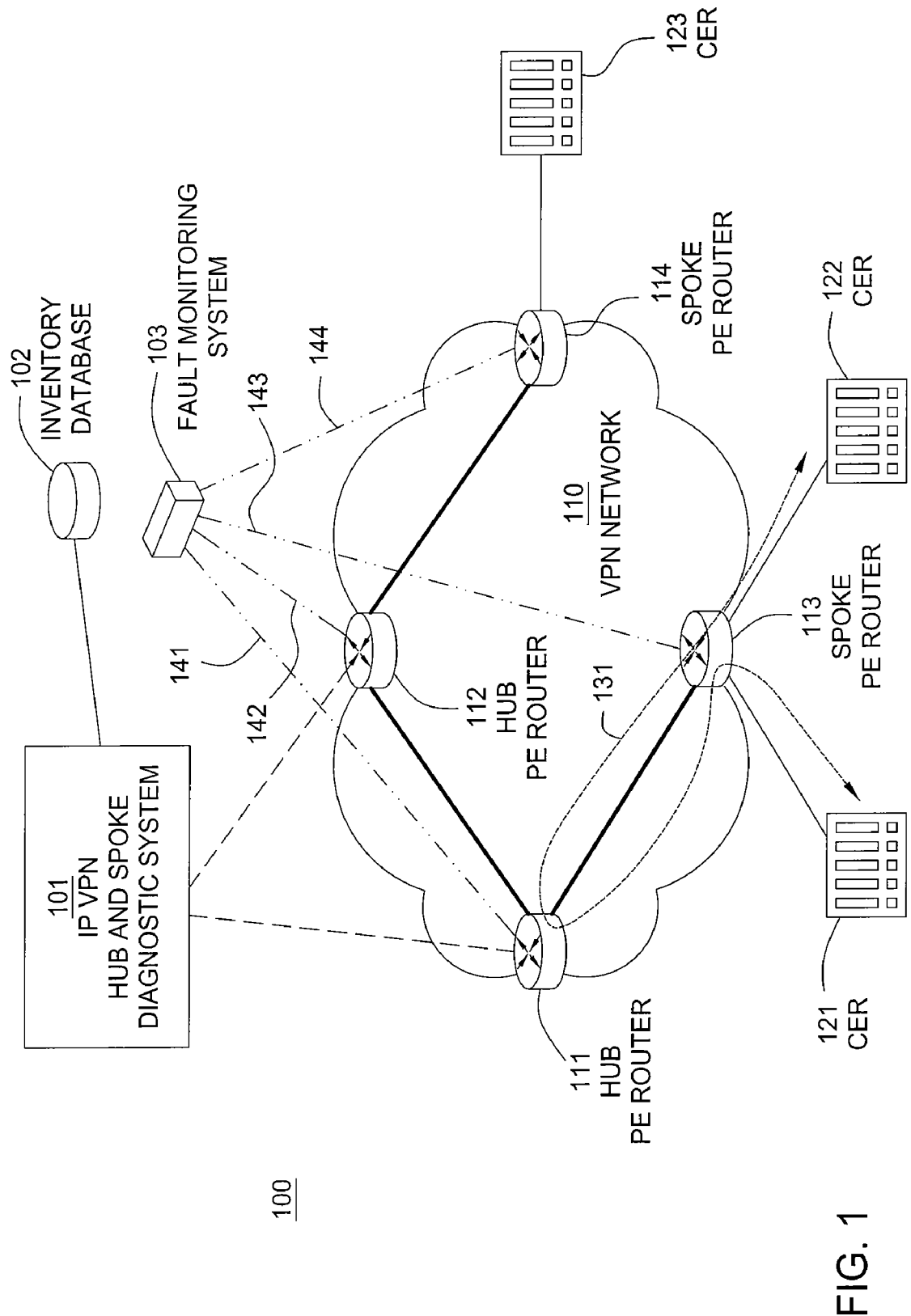
FIG. 1 illustrates a hub and spoke communications architecture having an example network, e.g., a packet network such as a hub and spoke IP VPN network related to the present invention.

To better understand the present invention, FIG. 1 illustrates a hub and spoke communications architecture 100 having an example network, e.g., a packet network such as a hub and spoke IP VPN network related to the present invention. In FIG. 1, a customer subscribes to the hub and spoke IP VPN service using hub and spoke IP VPN network 110. Hub and spoke IP VPN network 110 comprises hub provider edge (PE) routers, 111 and 112, and spoke PE routers, 113 and 114. Customer edge routers (CER), 121 and 122, are connected to spoke PE router 113 and customer edge router, 123, is connected to spoke PE router 114.

Note that direct communications between CERs via a spoke PE router are not allowed. Communications between CERs must go through a hub PE router. For example, communications between CER 121 and CER 122 connected to spoke PE router 113 must go through hub PE router 111 using flow 131 as shown.

In one embodiment, a fault monitoring system 103 collects all fault related information and status from all hub and spoke PE routers in the network 110. Inventory database 102 stores all IP VPN provisioning and configuration information of hub and spoke IP VPN network 110 associated with the hub and spoke IP VPN service subscribed by the customers.

IP VPN hub and spoke diagnostic system 101 can send diagnostic commands to and retrieve hub and spoke IP VPN network information via hub PE routers, 111 and 112, using links 141 and 142, respectively. In one embodiment, diagnostic commands to retrieve hub and spoke IP VPN network information from spoke PE routers 113 and 114 are conducted via hub PE routers 111 and 112, respectively. Alternatively, IP VPN hub and spoke diagnostic system 101 may send diagnostic commands to and retrieve hub and spoke IP VPN network information via spoke PE routers, 113 and 114, using links 143 and 144, respectively.

In one embodiment, the IP VPN hub and spoke diagnostic system 101 retrieves stored IP VPN provisioning and configuration information of hub and spoke IP VPN network 110 associated with the hub and spoke IP VPN service subscribed by the customers from inventory database 102. Similarly, the IP VPN hub and spoke diagnostic system 101 will also retrieve fault related information about the hub and spoke IP VPN network 110 associated with the hub and spoke IP VPN service subscribed by the customer from fault monitoring system 103.

Figure 2A:
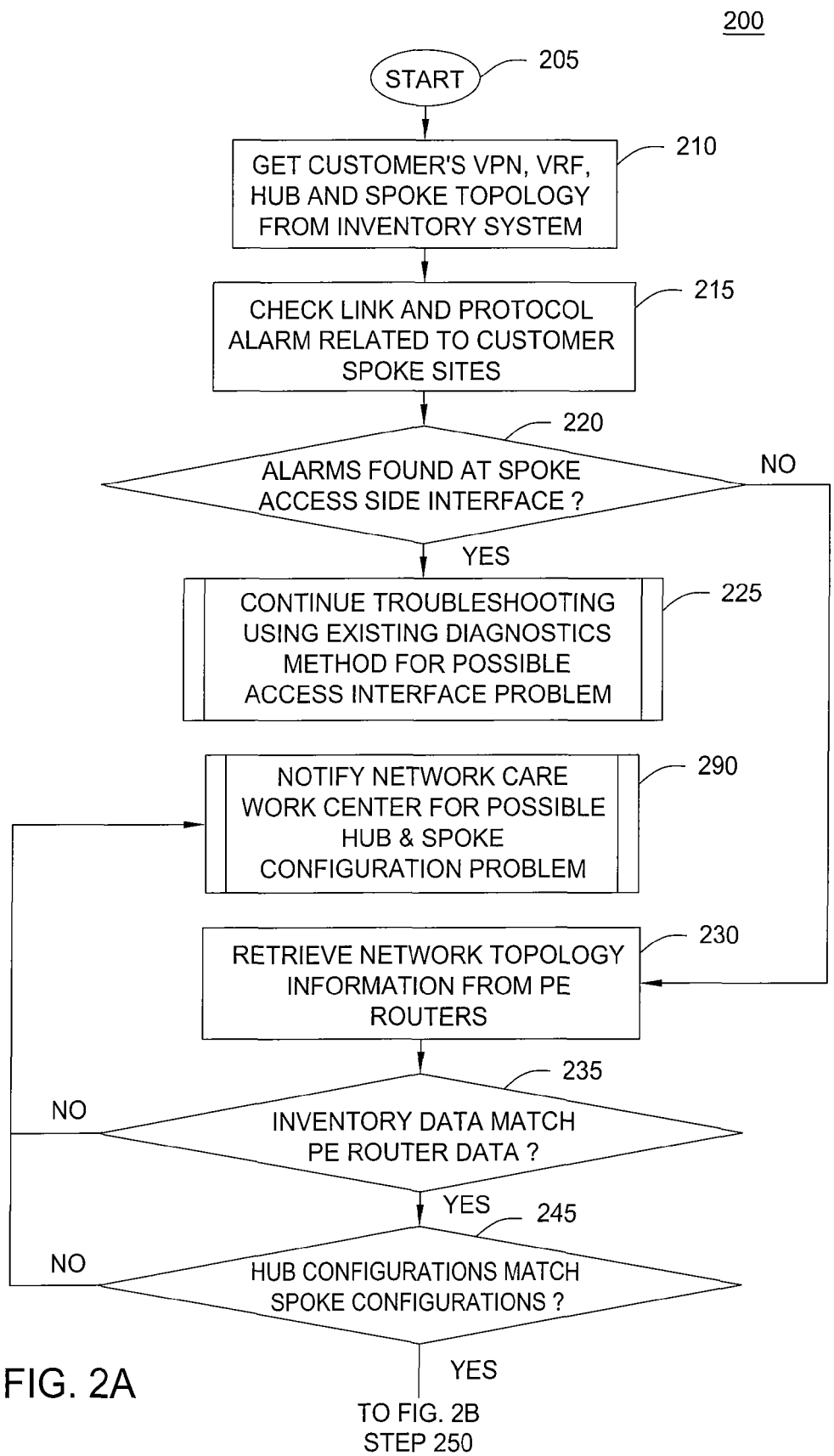
FIG. 2 illustrates a flowchart of a method for automating hub and spoke network trouble diagnostics in a packet network, e.g., a hub and spoke IP VPN network, of the present invention.
Figure 2B:
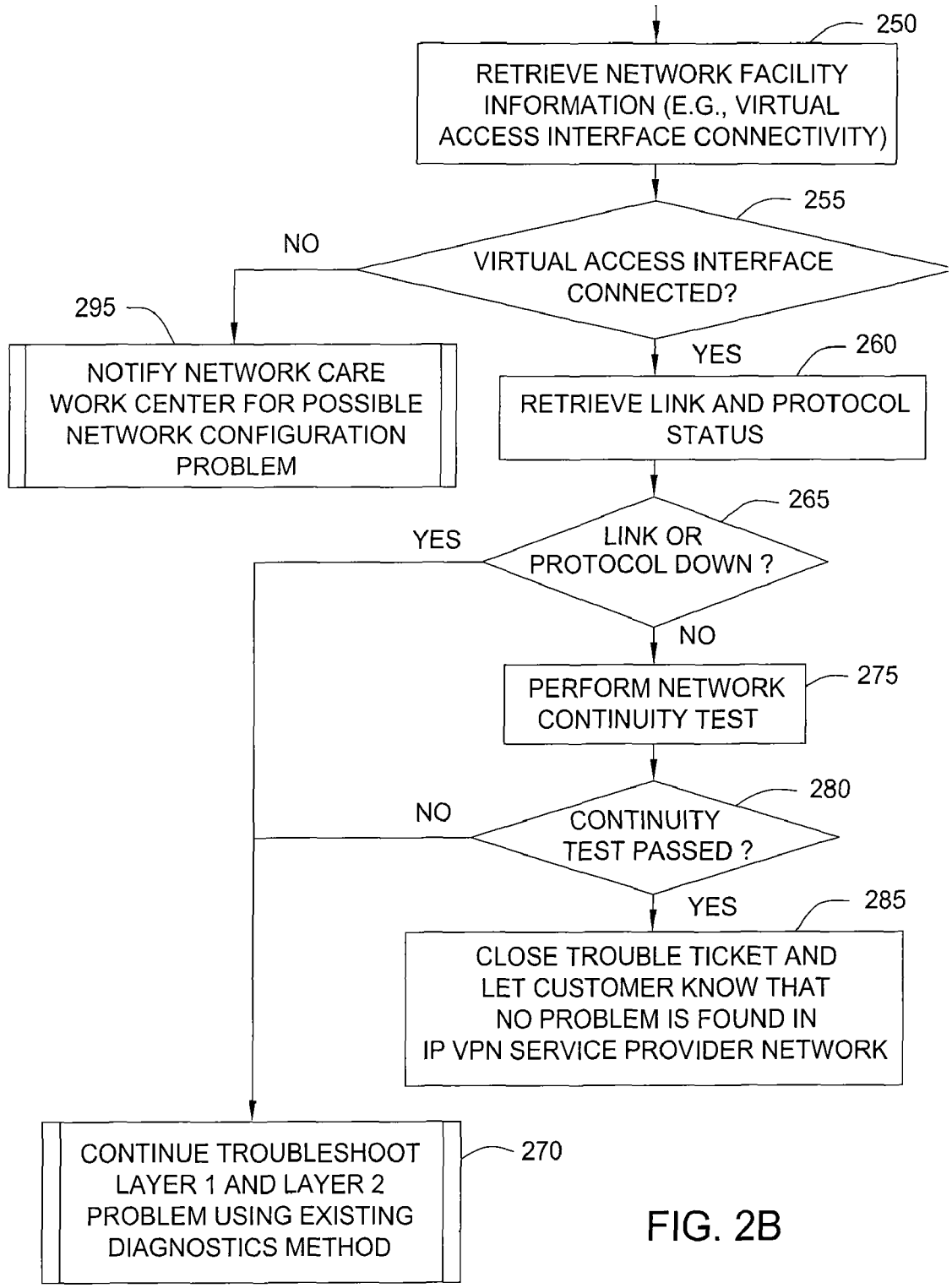

FIG. 2 illustrates a flowchart of a method 200 for automating hub and spoke IP VPN trouble diagnostics of the present invention. For example, method 200 can be implemented by an IP VPN hub and spoke diagnostic system. Method 200 starts in step 205 and proceeds to step 210.

In step 210, the method retrieves provisioning and configuration data, e.g., information related to the hub and spoke IP VPN, the virtual routing and forwarding data, and the VPN topology from the inventory database, such as inventory database 102. Virtual Routing and Forwarding (VRF) is a technology used in computer networks, especially VPN networks, that allows multiple instances of routing table to co-exist within the same router at the same time. Each VPN network uses an independent instance of VRF, or routing table, for routing packets within the VPN. This information includes, but is not limited to, hub sites, spoke sites, underlying network facility information, connection speed, packet routing and forwarding information, as well as IP VPN service subscription related information.

In step 215, the method checks link and protocol alarms associated with the access portion of the IP VPN network, such as link and protocol alarms related to faults between spoke PE routers and CERs. For example, the link and protocol alarms (broadly referred to as access interface alarm information) are retrieved from fault monitoring system 103.

In step 220, the method checks if alarms are found for the access side interfaces of the spoke PE routers. If alarms are found for the access side interfaces of the spoke PE routers, the method proceeds to step 225; otherwise, the method proceeds to step 230.

In step 225, the method notifies the appropriate customer care center to troubleshoot access related problems using existing diagnostic methods. Namely, the method reaches this step because an access related problem (broadly an access interface error) is the most likely root cause of the access problem.

In step 230, the method retrieves provisioning and configuration data, e.g., network topology information from PE routers, such as hub PE routers 111 and 112, in the network. The method retrieves network facility status data, e.g., all virtual access interfaces and route targets information related to the VRF associated with the VPN network. Using the retrieved virtual access interfaces as keys, the method retrieves the VRFs for both the downstream and the upstream interfaces associated with the VPN. Upstream direction is in the direction from a spoke PE router to a hub PE router, while downstream direction is in the direction from a spoke PE router to a CE router. Using the retrieved upstream VRF as a key, the method retrieves all virtual access interfaces and route targets related to the upstream VRF.

Virtual access interfaces are logical communication interfaces used by a router to communicate with another router. Route target is a label or a tag used to label a particular connectivity or flow between a pair of PE router and a CER. For a pair of hub and spoke PE routers to communicate with each other, the route target is used to identify that particular connectivity or flow between the router pair.

For example, if a spoke PE router sends packets originated from a particular CER, e.g., a particular customer spoke of a VPN network, to a hub PE router, a route target is used to uniquely identify the packet connectivity or flow from the CER to the spoke PE router and to the hub PE router. In addition, the export route target used by the spoke PE router and the import route target used by the hub PE router must match for the communications to work properly. The term export route target can be considered as the transmitting side route target label used by the transmitting PE router while the term import route target can be considered as the receiving side route target label used by the receiving PE router.

In step 235, the method compares the import and the export route target communities retrieved from PE routers to those retrieved from the inventory database, in step 210, to see if they match. In other words, the method compare the sets of route targets, used to identify individual connectivity or flow between all hub and spoke router pairs associated with a particular VPN network, retrieved from the inventory database and those from the PE routers to see if they match. If a match is found, the method proceeds to step 245; otherwise, the method proceeds to step 290.

In step 245, the method checks if the hub route targets match the corresponding spoke route targets configurations. In particular, the method checks if a spoke export route target matches a corresponding hub import route target and if a spoke import route target matches a corresponding hub export route target between a particular hub and spoke router pair. If a match is found, the method proceeds to step 250; otherwise, the method proceeds to step 290.

In step 250, the method retrieves virtual access interface connectivity status from PE routers in the VPN network.

In step 255, the method checks if a virtual access interface is connected. Namely, the method is determining whether there is a network configuration problem. If the virtual access interface is connected, the method proceeds to step 260; otherwise, the method proceeds to step 295.

In step 260, the method retrieves link and protocol status information from PE routers in the VPN network. The link and protocol status provides information about the health status of the link and protocol interfaces between PE routers and CE routers.

In step 265, the method checks if link and protocol status of any interfaces is down. If link and protocol status of any interfaces is down, the method proceeds to step 270; otherwise, the method proceeds to step 275.

In step 270, the method notifies the appropriate work center to continue to troubleshoot layer 1 and layer 2 problems using existing diagnostics methods. The method reaches this step because the reported hub and spoke IP VPN problem is narrowed down to problems related to layer 1 or layer 2 link and protocol problems.

In step 275, the method performs network connectivity tests using the extended ping method employing a hub PE router's IP address as the source IP address and a CE router's IP address as the destination IP address. The ping command is a tool used to test whether a particular target host specified by the destination IP address is reachable across an IP network from a source host specified by the source IP address.

In step 280, the method checks if the network connectivity tests have passed. If the network connectivity tests have passed, the method proceeds to step 285; otherwise, the method proceeds to step 270.

In step 285, the method closes the trouble ticket reporting the original hub and spoke IP VPN network problem and then informs customer that no problem has been found in the service provider portion of the IP VPN network. The method reaches this step because all automated diagnostic steps have found no problems in the service provider portion of the IP VPN network.

In step 290, the method notifies the appropriate network care work center to investigate a possible hub and spoke provisioning and configuration problem, such as mismatched import and export route targets between a hub and spoke PE pair or mismatched provisioning and configuration data between the inventory database and those in the PE routers in the VPN network. The method reaches this step because a provisioning and/or configuration error (broadly a configuration error) associated with at least one hub router or at least one spoke router is the most likely root cause of the network problem.

In step 295, the method notifies the appropriate network care work center to investigate possible network configuration error in the VPN network. The method reaches this step because there is likely a network configuration problem between hub and spoke PE routers.

It should be noted that although not specifically specified, one or more steps of method 200 may include a storing, displaying and/or outputting step as required for a particular application. In other words, any data, records, fields, and/or intermediate results discussed in the method can be stored, displayed and/or outputted to another device as required for a particular application. Furthermore, steps or blocks in FIG. 2 that recite a determining operation or involve a decision, do not necessarily require that both branches of the determining operation be practiced. In other words, one of the branches of the determining operation can be deemed as an optional step.

Figure 3:
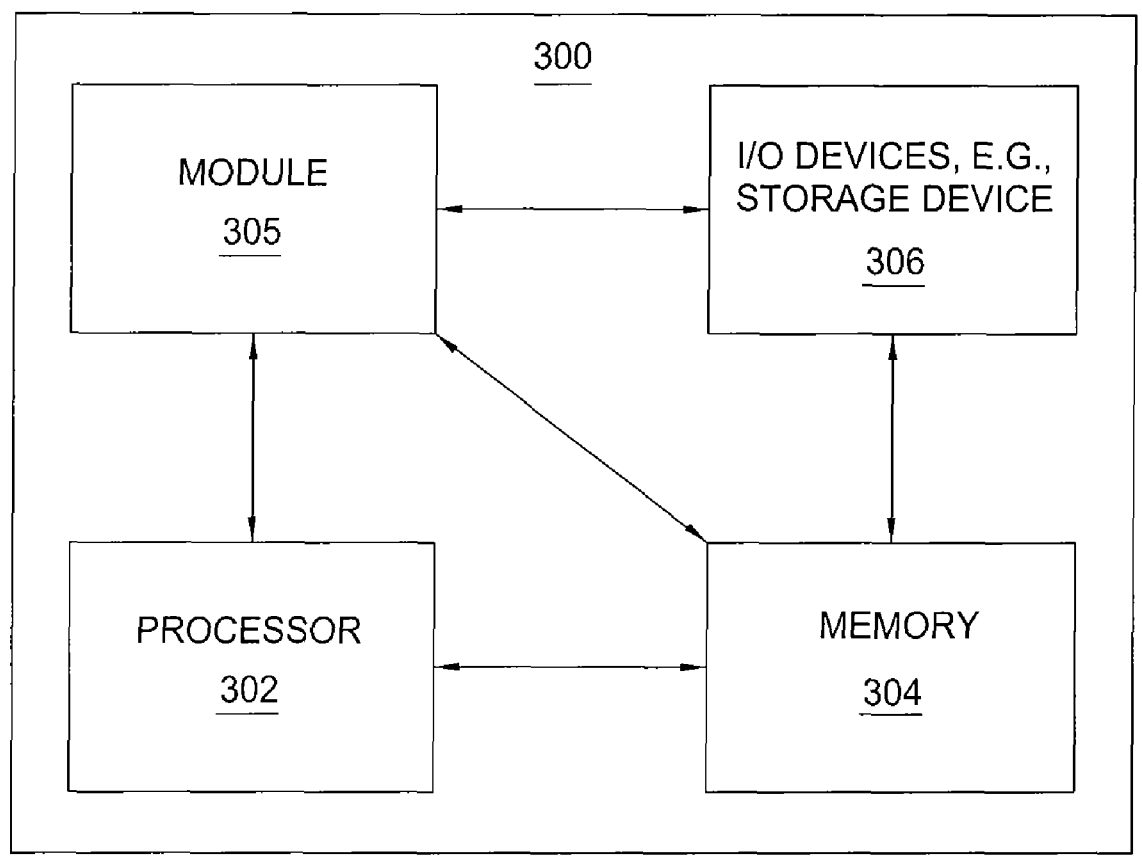
FIG. 3 illustrates a high level block diagram of a general purpose computer suitable for use in performing the functions described herein.

FIG. 3 depicts a high level block diagram of a general purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for automating hub and spoke IP VPN trouble diagnostics, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 305 for automating hub and spoke IP VPN trouble diagnostics can be loaded into memory 304 and executed by processor 302 to implement the functions as discussed above. As such, the present process 305 for automating hub and spoke IP VPN trouble diagnostics (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for determining a root cause of a problem in a communication network, comprising:

retrieving provisioning and configuration data, access interface alarm information, and network facility status data related to the communication network by a diagnostic system, wherein the retrieving comprises:
   retrieving first provisioning and configuration data and the network facility status data from a hub router and a spoke router within the communication network, wherein the network facility status data comprises a virtual access interface connectivity status and a link and protocol status from the hub router and the spoke router within the communication network;
   retrieving second provisioning and configuration data from an inventory database associated with the communication network; and
   retrieving the access interface alarm information from a fault monitoring system associated with the communication network; and
identifying the root cause of the problem of the communication network, based upon the first provisioning and configuration data, the access interface alarm information, and network facility status data retrieved from the hub router and the spoke router, the second provisioning and configuration data retrieved from the inventory database, and the access interface alarm information retrieved from the fault monitoring system.

2. The method of claim 1, further comprising:
notifying a network care center of the root cause of the problem.

3. The method of claim 2, wherein the notifying comprises:
notifying the network care center of a configuration error associated with the hub router or the spoke router as the root cause if the first provisioning and configuration data and the second provisioning and configuration data are inconsistent or mismatched;
notifying the network care center of an access interface error as the root cause if an access interface alarm exists;
notifying the network care center of a network configuration error as the root cause if the virtual access interface connectivity status identifies a virtual access interface that is not connected; and
notifying the network care center of a potential problem in a layer of the network if a link and protocol problem is identified.

4. The method of claim 1, wherein the communication network is a hub and spoke internet protocol virtual private network.

5. The method of claim 1, wherein the provisioning and configuration data comprise virtual routing and forwarding information associated with the communication network.

6. The method of claim 1, wherein the identifying comprises:
comparing the first provisioning and configuration data retrieved from the hub router and the spoke router with the second provisioning and configuration data retrieved from the inventory database to check if the first provisioning and configuration data matches the second provisioning and configuration data;
checking the first provisioning and configuration data are consistent between the hub router and the spoke router;
checking the network facility status data for detecting if a problem exists; and checking the access interface alarm information for detecting if an access interface alarm exists.

7. The method of claim 6, wherein the consistency between the first provisioning and configuration data retrieved from the hub router and the spoke router is verified by checking whether a spoke export route target value is equal to a hub import route target value and whether a spoke import target value is equal to a hub export route target value.

8. The method of claim 1, further comprising:
performing a ping command network connectivity test using a source internet protocol address of the hub router and a destination internet protocol address of a customer edge router if the root cause of the problem of the communication network is not identified based upon the first provisioning and configuration data, the access interface alarm information, and network facility status data retrieved from the hub router and the spoke router, the second provisioning and configuration data retrieved from the inventory database, and the access interface alarm information retrieved from the fault monitoring system.

9. The method of claim 8, wherein the performing further comprises:
closing a trouble ticket associated with the problem of the communication network if the ping command network connectivity test has passed successfully; and
notifying a network care center of a potential problem in a layer of the network if the ping command network connectivity test has failed.

10. The method of claim 1, wherein the provisioning and configuration data comprise route target information associated with the communication network.

11. The method of claim 1, wherein the provisioning and configuration data comprise virtual access interface information associated with the communication network.

12. A non-transitory computer-readable medium having stored thereon a plurality of instructions, the plurality of instructions including instructions which, when executed by a processor, cause the processor to perform method for determining a root cause of a problem in a communication network, comprising:
retrieving provisioning and configuration data, access interface alarm information, and network facility status data related to the communication network by a diagnostic system, wherein the retrieving comprises:
retrieving first provisioning and configuration data and the network facility status data from a hub router and a spoke router within said the communication network, wherein the network facility status data comprises a virtual access interface connectivity status and a link and protocol status from the hub router and the spoke router within the communication network;
retrieving second provisioning and configuration data from an inventory database associated with the communication network; and
retrieving said the access interface alarm information from a fault monitoring system associated with the communication network; and
identifying the root cause of said the problem of the communication network, based upon the first provisioning and configuration data, the access interface alarm information, and network facility status data retrieved from the hub router and the spoke router, the second provisioning and configuration data retrieved from the inventory database, and the access interface alarm information retrieved from the fault monitoring system.

13. The computer-readable medium of claim 12, further comprising:
notifying a network care center of the root cause of the problem.

14. The computer-readable medium of claim 12, wherein the communication network is a hub and spoke internet protocol virtual private network.

15. The computer-readable medium of claim 12, wherein the provisioning and configuration data comprise virtual routing and forwarding information associated with the communication network.

16. The computer-readable medium of claim 12, wherein the identifying comprises:
comparing the first provisioning and configuration data retrieved from the hub router and the spoke router with the second provisioning and configuration data retrieved from the inventory database to check if the first provisioning and configuration data matches the second provisioning and configuration data;
checking the first provisioning and configuration data are consistent between the hub router and the spoke router;
checking the network facility status data for detecting if a problem exists; and
checking the access interface alarm information for detecting if an access interface alarm exists.

17. The computer-readable medium of claim 16, wherein the consistency between the first provisioning and configuration data retrieved from the hub router and the spoke router is verified by checking whether a spoke export route target value is equal to a hub import route target value and whether a spoke import target value is equal to a hub export route target value.

18. The computer-readable medium of claim 12, wherein the provisioning and configuration data comprise route target information associated with the communication network.

19. The computer-readable medium of claim 12, wherein the provisioning and configuration data comprise virtual access interface information associated with the communication network.

20. An apparatus for determining a root cause of a problem in a communication network, comprising:
means for retrieving provisioning and configuration data, access interface alarm information, and network facility status data related to the communication network by a diagnostic system, wherein the means for retrieving retrieves first provisioning and configuration data and the network facility status data from a hub router and a spoke router within the communication network, wherein the network facility status data comprises a virtual access interface connectivity status and a link and protocol status from the hub router and the spoke router within the communication network, retrieves second provisioning and configuration data from an inventory database associated with the communication network, and retrieves the access interface alarm information from a fault monitoring system associated with the communication network; and
means for identifying the root cause of the problem of the communication network, based upon the first provisioning and configuration data, the access interface alarm information, and network facility status data retrieved from the hub router and the spoke router, the second provisioning and configuration data retrieved from the inventory database, and the access interface alarm information retrieved from the fault monitoring system.

* * * * *